UNITED STATES PATENT OFFICE.

MAX WOLFF, OF SOUTHWARK, LONDON, ENGLAND.

PROCESS OF MAKING PRINTING-INK.

1,094,288.  Specification of Letters Patent.  Patented Apr. 21, 1914.

Application filed April 28, 1913. Serial No. 764,176.

*To all whom it may concern:*

Be it known that I, MAX WOLFF, a citizen of the United States of America, residing at 89 Sumner street, Southwark, in the county of London, England, manufacturer, have invented a new and useful Process of Making Printing-Ink, of which the following is a specification.

This invention relates to the manufacture of printing ink and its object is to reduce the cost of production by the employment of inexpensive raw materials as substitute ingredients and by reducing the quantities of high priced materials hitherto employed.

I have found that ordinary peat under certain treatment offers an excellent substitute for the various forms of carbon generally used in printing ink processes and this discovery forms broadly the pith of my invention. Instead of peat, other fibrous vegetable materials may be used if rendered peatlike by semi-carbonization at the same time suitably varying the process indicated herebelow.

In carrying out the process with peat it is necessary to eliminate the iron, lime, magnesia and the like commonly contained in peat, which may be done by subjecting the wet or moist peat to pressure and drawing off the water, which carries with it the greater part of the iron, lime, magnesia and the like. The second step is the preparation of a bath with one or more silicates of one or more alkali metals preferably silicate of soda of viscous consistency and of a density of about 100° Twaddell. The proportion may vary considerably but 10 lbs. of such silicate of soda to about 50 gallons of water has been found efficient. It is advantageous to add the silicate gradually to the boiling water with continuous stirring. The next step is to add to the bath about 3 to 6 per cent. by weight, of vegetable black, continuing the stirring and maintaining the temperature at 100° C. or thereabout. In the next or fourth step the pressed peat is added to the bath and boiled for say 30 to 60 minutes more or less till it partly liquefies and partly forms a strong paste. The liquid part may then be drawn off for further use and the pulp-like residue which consists mostly of loosened or dissolved fiber is strained and then mixed with suitable oils, for instance linseed, resin, and like oils, before and after which the product obtained may be ground in an ordinary printing ink mill or in any other convenient manner to insure evenness and uniformity. Instead of part or the whole of the resin and like oils, I can use the residues of distillation of petroleum if necessary mixed with more volatile hydrocarbon or I may use crude petroleum.

Steps 3 and 4 may be interchanged and numerous other modifications of the method described are admissible without departing from the nature of the invention.

Of the relatively expensive oils and varnishes and black pigments much less is required by my process than by ordinary methods.

A number of other partially carbonized vegetable fibers may be employed as equivalents of the peat and as pigments or thickening materials and the purifying, solving and treating steps modified accordingly.

I claim:

1. A printing ink comprising a partly carbonized fibrous vegetable material, an alkaline silicate, and oil.

2. A printing ink comprising peat, an alkaline silicate, and oil.

3. A printing ink comprising peat, an alkaline silicate, a pigment, and oil.

4. A printing ink comprising peat, an alkaline silicate, a pigment, and oily matter derived from petroleum.

5. A printing ink comprising peat, an alkaline silicate, a pigment, oily matter derived from petroleum and resin oil.

6. A process of making a printing ink, consisting in pressing peat, drawing off the liquid therefrom, preparing a bath of an alkaline silicate and water, adding a pigment to said bath, adding the pressed peat to said bath, boiling said peat in said bath, drawing off the liquid from said peat, mixing said drained peat with oil, and grinding the mixture.

7. A process of making a printing ink, consisting in pressing peat, drawing off the liquid therefrom, preparing a bath of sodium silicate and water at an elevated temperature, adding vegetable black to said bath, adding the pressed peat to said bath, boiling said peat in said bath, drawing off the liquid from said peat, mixing said drained peat with oily matter derived from petroleum, and grinding the mixture.

8. A process of making a printing ink, consisting in pressing peat, drawing off the liquid therefrom, preparing a bath of sodium silicate and water at an elevated temperature, adding vegetable black to said bath, adding the pressed peat to said bath, boiling said peat in said bath, drawing off the liquid from said peat, mixing said drained peat with oily matter derived from petroleum, and resin oil, and grinding the mixture.

9. A process of making a printing ink, consisting in pressing peat, drawing off the liquid therefrom, preparing a bath of sodium silicate and water at an elevated temperature, adding vegetable black to said bath, adding the pressed peat to said bath, boiling said peat in said bath, drawing off the liquid from said peat, mixing said drained peat with a residue from the distillation of petroleum mixed with a light hydrocarbon, and grinding the mixture.

MAX WOLFF.

Witnesses:
ERNST TAPPERT,
H. D. JAMISON.